(12) United States Patent
Köhler et al.

(10) Patent No.: US 9,448,582 B2
(45) Date of Patent: Sep. 20, 2016

(54) COMPUTER HOUSING AND ARRANGEMENT

(71) Applicant: Fujitsu Technology Solutions Intellectual Property GmbH, München (DE)

(72) Inventors: Friedrich Köhler, Augsburg (DE); Lorenz Schelshorn, Augsburg (DE); Wilfried Weidner, Königsbrunn (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 47 days.

(21) Appl. No.: 14/354,641

(22) PCT Filed: Sep. 26, 2012

(86) PCT No.: PCT/EP2012/069008
§ 371 (c)(1),
(2) Date: Apr. 28, 2014

(87) PCT Pub. No.: WO2013/060547
PCT Pub. Date: May 2, 2013

(65) Prior Publication Data
US 2014/0293526 A1    Oct. 2, 2014

(30) Foreign Application Priority Data
Oct. 28, 2011    (DE) .......................... 10 2011 117 225

(51) Int. Cl.
*G06F 1/16*    (2006.01)
*G06F 1/18*    (2006.01)

(52) U.S. Cl.
CPC ........ *G06F 1/16* (2013.01); *G06F 1/181* (2013.01); *G06F 1/184* (2013.01)

(58) Field of Classification Search
CPC ..... H05K 7/14; H05K 7/1417; H05K 7/1427; H05K 7/1429; H05K 7/1431; H05K 7/1349; G06F 1/183; G06F 1/184; G06F 1/186
See application file for complete search history.

(56) References Cited

U.S. PATENT DOCUMENTS

| | | | | |
|---|---|---|---|---|
| 5,140,346 A | * | 8/1992 | Goto et al. | 346/145 |
| 5,460,441 A | * | 10/1995 | Hastings et al. | 312/298 |
| 5,661,640 A | | 8/1997 | Mills et al. | |
| 5,822,182 A | * | 10/1998 | Scholder et al. | 361/679.57 |
| 6,025,989 A | * | 2/2000 | Ayd et al. | 361/695 |
| 6,111,754 A | * | 8/2000 | Abbott et al. | 361/724 |
| 6,292,361 B1 | * | 9/2001 | Johnson et al. | 361/679.54 |
| 6,297,955 B1 | * | 10/2001 | Frank et al. | 361/679.41 |

(Continued)

FOREIGN PATENT DOCUMENTS

| | | |
|---|---|---|
| DE | 199 44 553 A1 | 3/2001 |
| DE | 101 06 555 A1 | 8/2002 |

(Continued)

*Primary Examiner* — Hoa C Nguyen
*Assistant Examiner* — Xanthia C Cunningham
(74) *Attorney, Agent, or Firm* — DLA Piper LLP (US)

(57) ABSTRACT

A computer housing that accommodates at least one motherboard, a power supply and further modules, wherein the housing includes at least a first level and a second level, wherein the second level is arranged horizontally above the first level, and an at least two-part motherboard carrier is arranged on the second level, wherein a first part of the motherboard carrier fixedly connects to the housing and a second part of the motherboard carrier is removable.

9 Claims, 3 Drawing Sheets

(56) References Cited

U.S. PATENT DOCUMENTS

| | | | |
|---|---|---|---|
| 6,304,437 B1 * | 10/2001 | Foo et al. | 361/679.6 |
| 6,700,776 B2 * | 3/2004 | Bang et al. | 361/679.58 |
| 6,747,877 B2 * | 6/2004 | Tonozuka | 361/797 |
| 6,788,544 B1 * | 9/2004 | Barsun et al. | 361/727 |
| 6,879,490 B2 * | 4/2005 | Mattei et al. | 361/727 |
| 6,922,336 B2 * | 7/2005 | Barsun et al. | 361/727 |
| 7,079,386 B1 * | 7/2006 | Jochym et al. | 361/679.47 |
| 7,269,020 B2 * | 9/2007 | Wang et al. | 361/727 |
| 7,315,251 B1 * | 1/2008 | Holland et al. | 340/635 |
| 9,007,084 B2 * | 4/2015 | Babcock et al. | 324/756.01 |
| 2002/0154474 A1 * | 10/2002 | Merz et al. | 361/683 |
| 2003/0016494 A1 * | 1/2003 | Chen | 361/687 |
| 2003/0030974 A1 | 2/2003 | Chen | |
| 2003/0099089 A1 * | 5/2003 | Chen | 361/685 |
| 2004/0042162 A1 * | 3/2004 | Barsun et al. | 361/683 |
| 2005/0146846 A1 * | 7/2005 | Chen et al. | 361/683 |
| 2005/0152106 A1 * | 7/2005 | Coster et al. | 361/683 |
| 2006/0227525 A1 * | 10/2006 | Hoshino et al. | 361/796 |
| 2007/0230102 A1 * | 10/2007 | Tsai | 361/683 |
| 2008/0212273 A1 * | 9/2008 | Bechtolsheim | 361/685 |
| 2009/0027843 A1 * | 1/2009 | Roesner | 361/683 |
| 2009/0147492 A1 | 6/2009 | Heinrichs et al. | |
| 2010/0053869 A1 | 3/2010 | Sun et al. | |
| 2011/0122576 A1 | 5/2011 | Kuo et al. | |
| 2012/0120611 A1 * | 5/2012 | Ni et al. | 361/727 |
| 2012/0327579 A1 * | 12/2012 | Chen et al. | 361/679.6 |
| 2013/0021742 A1 * | 1/2013 | Lee et al. | 361/679.32 |

FOREIGN PATENT DOCUMENTS

| | | |
|---|---|---|
| DE | 2003/104957 A2 | 12/2003 |
| DE | 102 25 915 B4 | 2/2005 |
| DE | 10 2007 058 724 B3 | 5/2009 |

\* cited by examiner

COMPUTER HOUSING AND ARRANGEMENT

TECHNICAL FIELD

This disclosure relates to a computer housing that accommodates at least one motherboard, a power supply and further modules, and to an arrangement with a housing of the above-mentioned kind, at least one motherboard, a power supply and further modules.

BACKGROUND

Previously, the individual parts (the motherboard, the power supply, the power board and so on) have been arranged such that each built-in part could be exchanged independently of the other built-in parts. The housing must not, however, be enlarged. That independent arrangement combined with the same housing size restricts the space available for the motherboard and the power supply, and the standard built-in parts can no longer be used. Instead, more expensive special built-in parts have to be used such as a multi-layer motherboard and/or a power supply with exclusive components.

It could therefore be helpful to provide a solution for arranging modules in a computer housing that allows inexpensive built-in parts to be used without the size of the housing having to be enlarged.

SUMMARY

We provide a computer housing that accommodates at least one motherboard, a power supply and further modules, wherein the housing includes at least a first level and a second level, wherein the second level is arranged horizontally above the first level, and an at least two-part motherboard carrier is arranged on the second level, wherein a first part of the motherboard carrier fixedly connects to the housing and a second part of the motherboard carrier is removable.

We also provide an arrangement that accommodates at least one motherboard, a power supply and further modules in a computer housing, including the housing, and the power supply is arranged on the first level below the first part of the motherboard carrier, and a power supply cable and the further modules are arranged on the first level below the second part of the motherboard carrier.

LIST OF REFERENCE SIGNS

Figure 1:
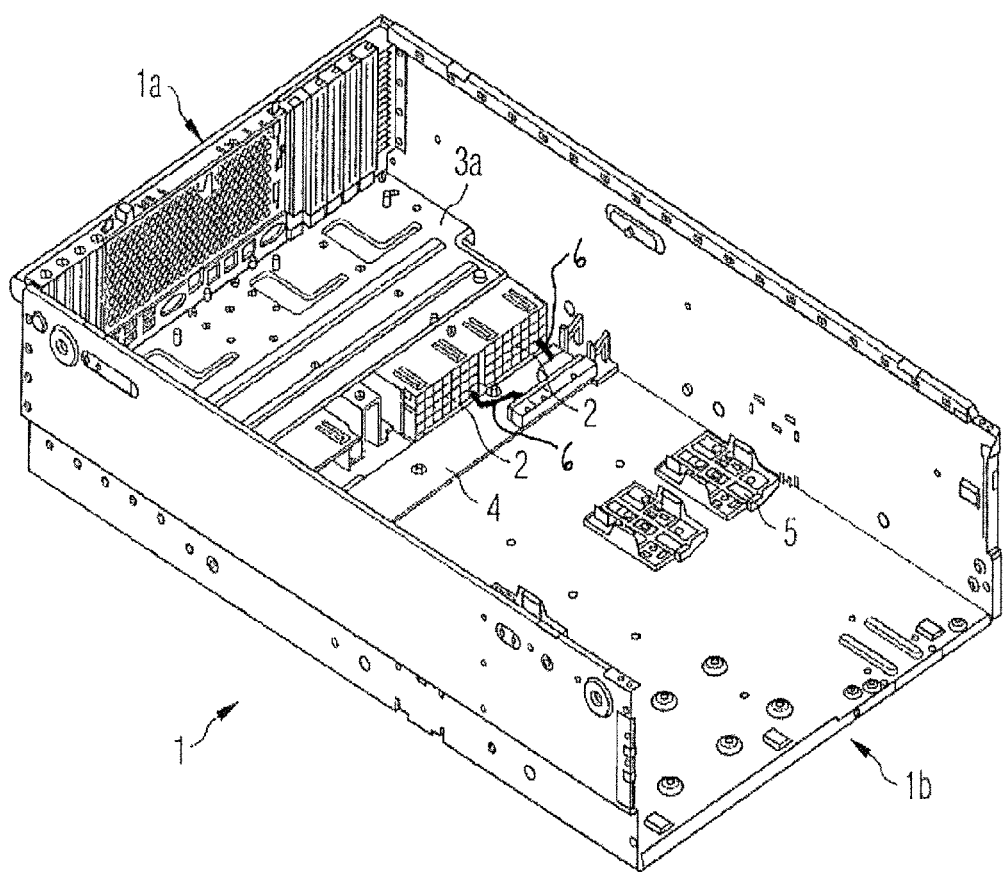
FIG. 1 shows a perspective view of an open computer housing in which the removable second part of the motherboard carrier has already been removed.

1 Computer housing
1a Rear end of the housing
1b Opened front face of the housing
2 Power supply
3a First part of the motherboard carrier (fixed)
3b Second part of the motherboard carrier (mobile)
4 Power board
5 Battery holder

DETAILED DESCRIPTION

We provide a housing having at least a first level and a second level, wherein the second level is arranged horizontally above the first level, and an at least two-part motherboard carrier is arranged on the second level, wherein a first part of the motherboard carrier fixedly connects to the housing and a second part of the motherboard carrier is removable.

An arrangement includes the housing, the power supply is arranged on the first level below the first part of the motherboard carrier, and a power supply cable and the further modules are arranged on the first level below the second part of the motherboard carrier.

Because the housing is divided horizontally into two levels, there is more installation area for the same housing size, that is, there are several options for installing additional parts. The first level and the second level are disposed approximately parallel to one another.

Because the second part of the motherboard carrier is removable, the components located beneath it are also easily accessible when servicing is required since the second part of the motherboard carrier can be dismantled when servicing is required, thus allowing free access to the modules and add-on boards in the first level.

The first part of the motherboard carrier preferably fixedly connects to the chassis for the sake of stiffness and manufacturing tolerances. The first part of the motherboard carrier is preferably mounted at the rear end of the housing.

The power supply, modules such as the power board, batteries, the PSU cable and other additional parts are preferably arranged on the first level. The power supply is preferably mounted below the first part of the motherboard carrier. The additional modules and additional parts are preferably arranged below the removable second part of the motherboard carrier so that they are more easily accessible for the purpose of possible replacement. This region of the first level can be fully utilized for extensions and additional modules without enlarging the housing and without adversely affecting the assembly and ease of servicing.

The motherboard is fixed to the motherboard carrier on the second level. The motherboard is configured in two parts corresponding to the motherboard carrier.

Our housings and arrangements will be explained in detail hereinafter by an example illustrated in the figures.

FIG. 1 shows a computer housing 1 without a cover. In the rear region of the housing 1, specifically the end 1a of the housing located opposite the opened front face 1b, the power supply 2 is arranged on the first level (the lower level). On a second level, specifically the upper level, a first part 3a of a motherboard carrier is arranged directly above the power supply 2. The first part 3a of the motherboard carrier fixedly connects to the housing 1. The motherboard is not installed and, therefore, not illustrated.

A power board 4 is mounted adjacent to the power supply 2. The power supply 2 is connected to the power board 4 via a power supply cable 6. The power board 4 is not covered by the first part 3a of the motherboard carrier. Battery holders 5 are also arranged on the first level.

Figure 2:
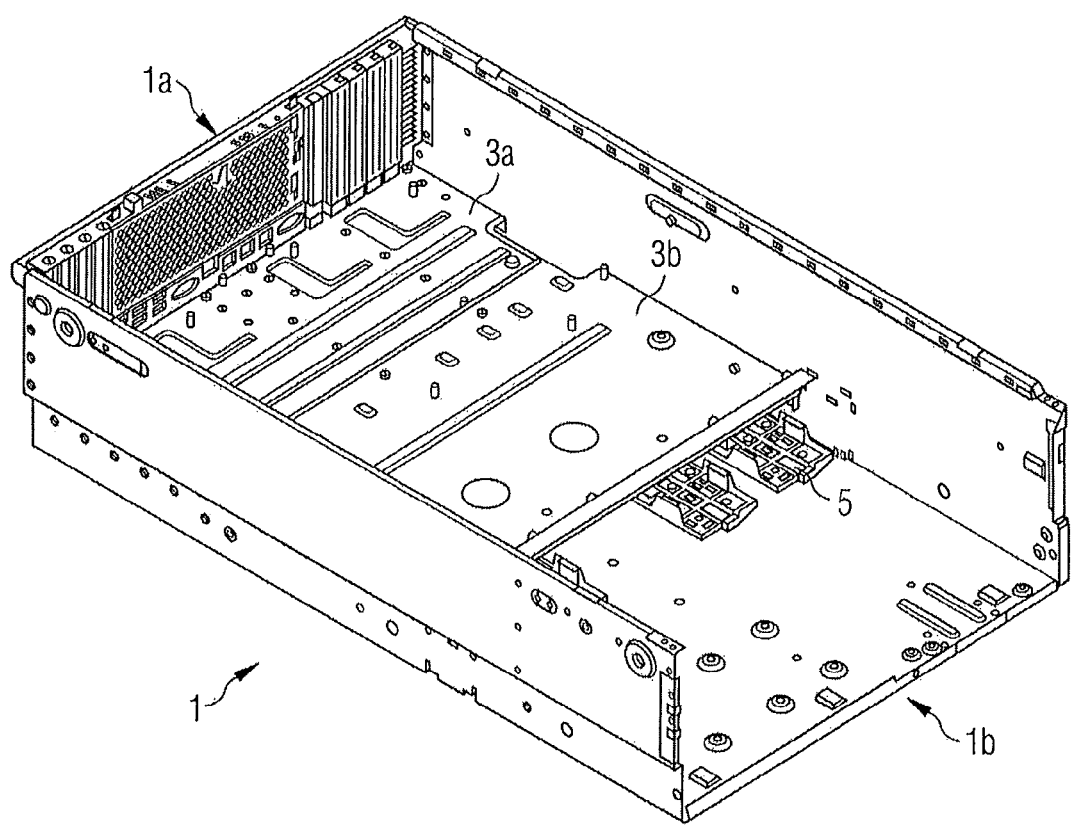
FIG. 2 shows a perspective view of the open computer housing illustrated in FIG. 1 with the removable second part of the motherboard carrier installed.

In FIG. 2, a mobile part 3b of the motherboard carrier, specifically the second part 3b of the motherboard carrier, is mounted on the second level adjacent to the first part 3a. The region of the first level in which the power board 4 and the battery holders 5 are located is therefore covered. Further modules or add-on boards can also be arranged in this region. The removable second part 3b of the motherboard carrier enables the modules beneath the mobile part 3b to be easily accessed if servicing is required.

Figure 3:
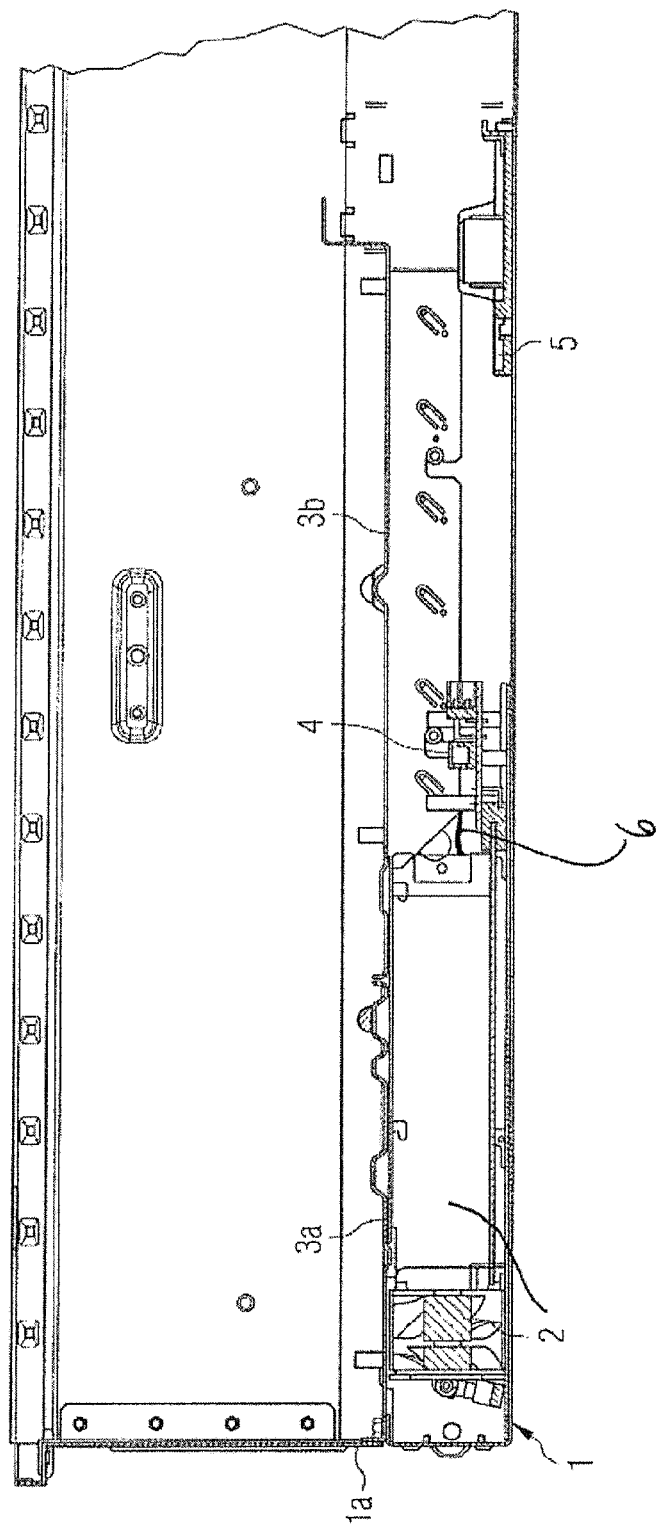
FIG. 3 shows a lateral cross-section of a part of the computer housing illustrated in FIG. 2.

FIG. 3 shows in cross-section a part of the housing 1 illustrated in FIG. 2. It can clearly be seen here that the power supply 2 is arranged beneath the first part 3a of the motherboard carrier and that the power board 4 and battery holders 5 are arranged beneath the removable second part 3b of the motherboard carrier.

The invention claimed is:

1. A computer housing that accommodates at least one motherboard, a power supply and further modules, wherein the housing comprises at least a first level and a second level, wherein the second level is arranged horizontally above the first level, and an at least two-part motherboard carrier is arranged on the second level, wherein a first part of the motherboard carrier fixedly connects to the housing and a second part of the motherboard carrier is removable relative to the first part of the motherboard carrier.

2. The housing according to claim 1, wherein the first part of the motherboard carrier is arranged at a rear end of the housing.

3. The housing according to claim 1, wherein the first part and second part of the motherboard carrier are arranged side by side.

4. An arrangement that accommodates at least one motherboard, a power supply and further modules in a computer housing, comprising:
   the housing according to claim 1, and
   the power supply is arranged on the first level below the first part of the motherboard carrier, and
   a power supply cable and the further modules are arranged on the first level below the second part of the motherboard carrier.

5. The arrangement according to claim 4, wherein a motherboard is mounted on the two-part motherboard carrier.

6. The housing according to claim 2, wherein the first part and second part of the motherboard carrier are arranged side by side.

7. An arrangement that accommodates at least one motherboard, a power supply and further modules in a computer housing, comprising:
   the housing according to claim 2, and
   the power supply is arranged on the first level below the first part of the motherboard carrier, and
   a power supply cable and the further modules are arranged on the first level below the second part of the motherboard carrier.

8. An arrangement that accommodates at least one motherboard, a power supply and further modules in a computer housing, comprising:
   the housing according to claim 3, and
   the power supply is arranged on the first level below the first part of the motherboard carrier, and
   a power supply cable and the further modules are arranged on the first level below the second part of the motherboard carrier.

9. A computer housing that accommodates at least one motherboard, a power supply and further modules, wherein the housing comprises at least a first level and a second level, wherein the second level is arranged horizontally above the first level, and an at least two-part motherboard carrier is arranged on the second level, wherein a first part of the motherboard carrier fixedly and non-moveably connects to the housing and a second part of the motherboard carrier is mounted on the second level adjacent to the first part and parallel to the second level and is removable relative to the first part of the motherboard carrier.

* * * * *